Aug. 12, 1924.  1,504,579
C. A. ROUNSAVILLE
APPARATUS FOR DESTROYING INSECTS
Filed April 27, 1923   2 Sheets-Sheet 1
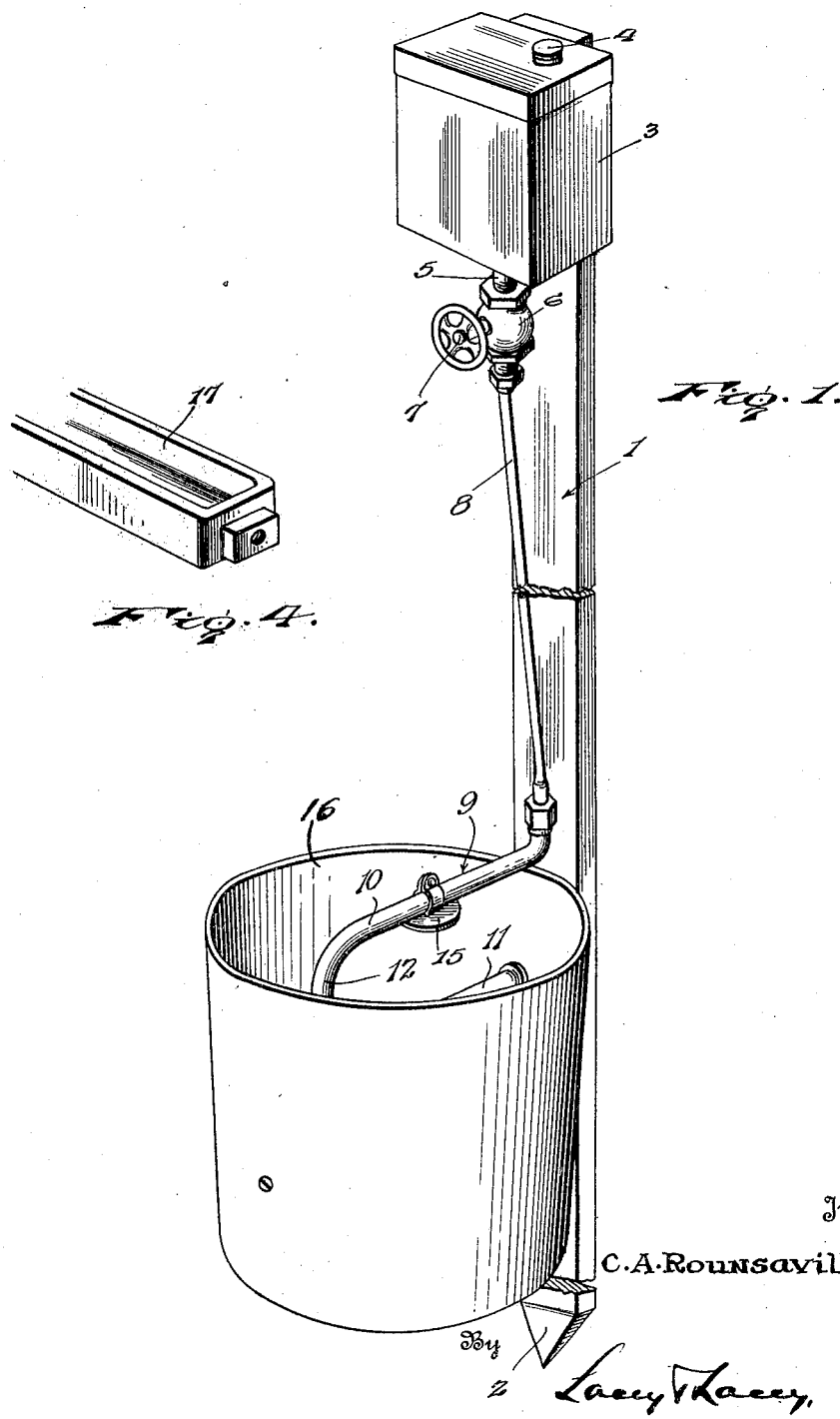

Aug. 12, 1924.
C. A. ROUNSAVILLE
1,504,579
APPARATUS FOR DESTROYING INSECTS
Filed April 27, 1923   2 Sheets-Sheet 2
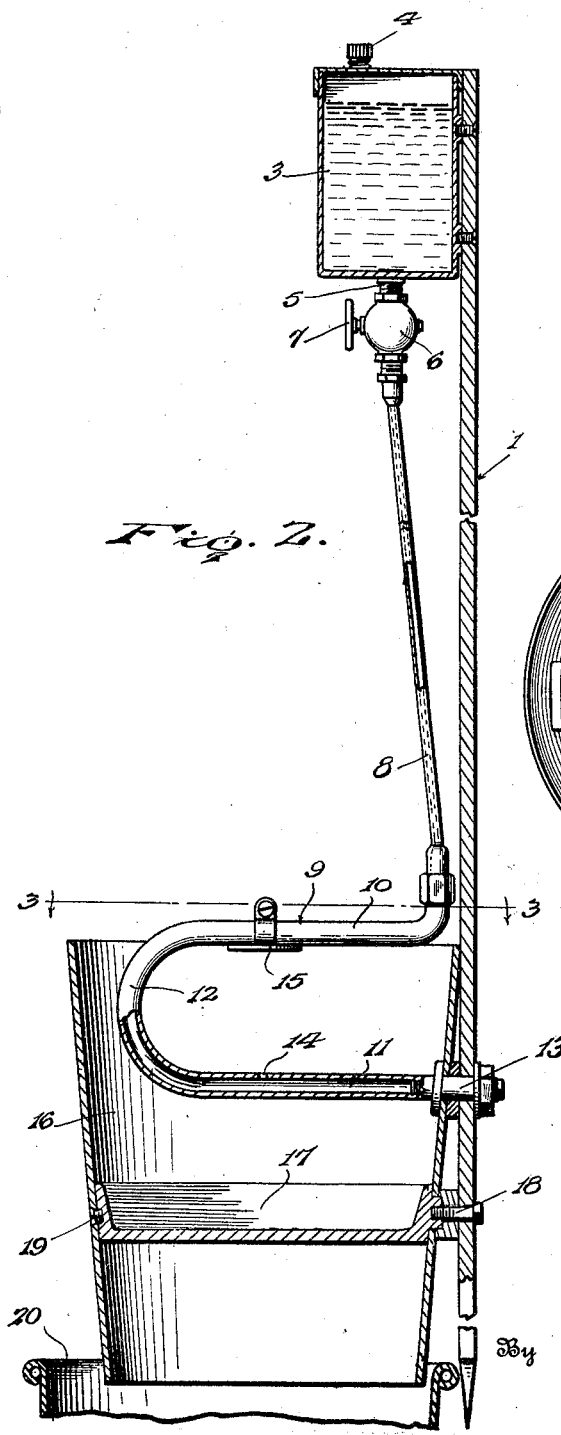
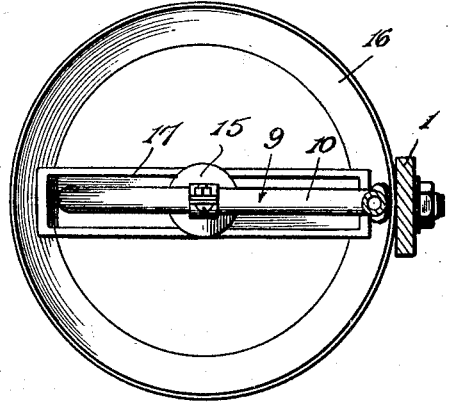
Inventor
C. A. Rounsaville.

Patented Aug. 12, 1924.

1,504,579

UNITED STATES PATENT OFFICE.

CHARLIE A. ROUNSAVILLE, OF SCOTTSBORO, ALABAMA.

APPARATUS FOR DESTROYING INSECTS.

Application filed April 27, 1923. Serial No. 635,162.

*To all whom it may concern:*

Be it known that I, CHARLIE A. ROUNSAVILLE, a citizen of the United States, residing at Scottsboro, in the county of Jackson and State of Alabama, have invented certain new and useful Improvements in Apparatus for Destroying Insects, of which the following is a specification.

This invention relates to an improvement in apparatus for destroying insects and has as its general object to provide an apparatus which will prove highly efficient in the destruction of boll weevils, bean beetles, mosquitoes, gnats, and other winged insects.

One of the primary objects of the invention is to provide an apparatus for destroying insects which apparatus may be set up in the locality in which the work is to be performed and, after being set in operation, will require little or no attention.

Another important object of the invention is to so construct the apparatus that the insects, as they are killed, will be collected so that they may be readily disposed of from time to time and without any inconvenience being experienced by the one attending to the apparatus.

Another object of the invention is to provide a simple apparatus for destroying insects, which apparatus may be manufactured at a low cost and operated at but little expense.

In the accompanying drawings:

Figure 1 is a perspective view of the apparatus embodying the invention;

Figure 2 is a vertical front to rear sectional view through the apparatus;

Figure 3 is a horizontal sectional view substantially on the line 3—3 of Figure 2 looking in the direction indicated by the arrows;

Figure 4 is a perspective view illustrating the fuel pan of the apparatus.

The apparatus embodying the invention comprises a standard 1 which may, if desired, be tapered or pointed at its lower end to adapt it to be driven into the ground, the said end of the standard being indicated by the numeral 2. However, if desired, some other provision might be made for supporting the standard in upright position, it being understood that any desired number of the apparatuses embodying the invention are to be arranged at various points of location in a field. The apparatus embodies means for propagating a brilliant flame to attract the insects to the apparatus and destroying them by this same medium, and to this end, a fuel reservoir 3 is fixed upon the standard 1 at or near the upper end thereof and is adapted to contain crude oil or other liquid fuel, the reservoir being provided with a filling opening closed by a cap 4, and being provided in its bottom with a short outlet nipple 5 to which is fitted a cut-off valve casing 6, the valve handle 7 being adapted to be adjusted so as to control the flow of fuel past the valve. A pipe 8 leads from the lower end of the valve casing 6 and extends substantially vertically downwardly in front of the standard 1 and communicates at its lower end with a burner tube which is indicated in general by the numeral 9.

The burner tube 9 referred to above comprises upper and lower arms 10 and 11 and a connecting forward bend 12. The fuel conducting pipe 8 is connected to the rear end of the upper arm 10 of the burner tube, and the corresponding end of the lower arm 11 is secured in any manner as indicated by the numeral 13, to the standard 1, the burner tube being provided in the upper side of its lower arm 11 with a discharge orifice 14 through which the fuel may issue, and a flame spreader 15 being supported upon the under side of the upper arm 10 immediately above the said orifice 14. The end of the lower arm 11 of the burner tube is, of course, closed, and the said end of the arm may not only be secured through the standard 1 but also through the wall of a jacket 16 within the upper portion of which the burner tube is housed as shown in Figures 1 and 2 of the drawings. The jacket 16 may be of sheet metal and is preferably of hollow inverted frusto-conical form, being open both at its top and at its bottom. A fuel pan 17 in the nature of an enlogated trough is arranged within the jacket 16 and extends diametrically thereof beneath and parallel to the lower arm 11 of the burner tube, a screw or other fastening means 18 being provided for securing the fuel pan at one end to the standard 1 and to the wall of the jacket, and a similar fastening element 19 being provided to secure the said pan at its other end to the wall of the jacket.

A receptacle 20 is preferably arranged beneath the open bottom of the jacket 16 and may contain water and a thin layer or stratum of oil.

In the operation of the apparatus, the valve 7 is adjusted so as to provide for the flow of liquid fuel from the reservoir 3 through the pipe 8 to the burner tube. The fuel will overflow from the lower arm of the tube through the orifice 14 and collect in the fuel pan 17 where the initial quantity of fuel supplied may be ignited so as to heat the burner tube. When the burner tube has become heated to a relatively high degree of temperature, the further quantity of fuel delivered thereto will be vaporized and discharged in a jet through the orifice 14 where it may be ignited and the flame thus propagated directed against the under side of the flame spreader 15. This device will serve to spread the flame so that it will extend over substantially the entire open top of the jacket 16. The insects will be attracted to the apparatus by the flame and, being incinerated, will fall through the jacket and into the receptacle 20 where they will be collected and from which they may be discharged at convenient intervals.

Having thus described the invention, what is claimed as new is:

An apparatus for destroying insects comprising a standard, a fuel reservoir mounted on the standard, a jacket having its upper and lower ends open throughout their entire area, a burner disposed in the upper portion of the jacket and in communication with the fuel reservoir, means for securing the end of the burner to the standard and to the jacket, a fuel pan extending diametrically across the jacket below the burner, means for securing one end of the fuel pan to the jacket, and means for securing the opposite end of the fuel pan to the standard and to the jacket.

In testimony whereof I affix my signature.

CHARLIE A. ROUNSAVILLE. [L. S.]